(12) United States Patent
Becker

(10) Patent No.: US 11,872,843 B2
(45) Date of Patent: *Jan. 16, 2024

(54) AXLE ADAPTER ASSEMBLY

(71) Applicant: Fox Factory, Inc., Duluth, GA (US)

(72) Inventor: William M. Becker, Aptos, CA (US)

(73) Assignee: Fox Factory, Inc., Duluth, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/228,369

(22) Filed: Apr. 12, 2021

(65) Prior Publication Data

US 2021/0229492 A1 Jul. 29, 2021

Related U.S. Application Data

(63) Continuation of application No. 16/204,669, filed on Nov. 29, 2018, now Pat. No. 10,974,547, which is a continuation of application No. 15/827,631, filed on Nov. 30, 2017, now Pat. No. 10,173,465, which is a continuation of application No. 14/987,616, filed on Jan. 4, 2016, now Pat. No. 9,845,130, which is a continuation-in-part of application No. 14/323,934, filed on Jul. 3, 2014, now Pat. No. 9,227,690.

(51) Int. Cl.
*B60B 35/00* (2006.01)
*B62K 25/02* (2006.01)

(52) U.S. Cl.
CPC ............ *B60B 35/004* (2013.01); *B62K 25/02* (2013.01)

(58) Field of Classification Search
CPC ...... B60B 35/004; B62K 21/02; B62K 25/02; B62K 25/04
See application file for complete search history.

(56) References Cited

U.S. PATENT DOCUMENTS

| | | |
|---|---|---|
| 5,984,423 A | 11/1999 | Becker |
| 6,109,635 A | 8/2000 | Maeda et al. |
| 6,886,894 B2 | 5/2005 | Kanehisa et al. |
| 8,382,134 B2 | 2/2013 | Bartlett et al. |
| 8,696,213 B2 | 4/2014 | Spahr et al. |
| 8,820,853 B1 | 9/2014 | Barefoot et al. |
| 9,227,690 B1 | 1/2016 | Becker |
| 9,845,130 B2 | 12/2017 | Becker |
| 10,173,465 B2 | 1/2019 | Becker |
| 10,974,547 B2 * | 4/2021 | Becker .................. B62K 25/02 |
| 2008/0211295 A1 | 9/2008 | Bartlett et al. |
| 2009/0274406 A1 | 11/2009 | Spahr et al. |
| 2012/0212040 A1 | 8/2012 | Lorscheider et al. |
| 2018/0086414 A1 | 3/2018 | Becker |

* cited by examiner

*Primary Examiner* — Jason R Bellinger

(57) ABSTRACT

An axle adapter assembly, configured for enabling conversion of an axle installed on a vehicle to fit different center bore sizes of wheel hubs, including: an axle configured for coupling dropouts of fork legs of a lower fork; adapters configured for being inserted within the dropouts; the adapters configured for engaging an outer surface of the axle and retaining the axle upon engagement; and axle pinch shims configured for being inserted into slits of the dropouts and the adapters, wherein upon the insertion, the adapters are aligned with the dropouts, such that shoulders of the adapters retain edges of a wheel hub of the wheel hubs.

7 Claims, 10 Drawing Sheets

AXLE ADAPTER ASSEMBLY

FIELD OF THE INVENTION

This application is a continuation application of and claims priority to and benefit of U.S. patent application Ser. No. 16/204,669, filed on Nov. 29, 2018, now U.S. Issued U.S. Pat. No. 10,974,547, entitled "AXLE ADAPTER ASSEMBLY" by William M. Becker, assigned to the assignee of the present application, and incorporated herein, in its entirety, by reference.

The application Ser. No. 16/204,669 is a continuation application of and claims priority to and benefit of U.S. patent application Ser. No. 15/827,631, filed on Nov. 30, 2017, now U.S. Issued U.S. Pat. No. 10,173,465, entitled "AXLE ADAPTER ASSEMBLY" by William M. Becker, assigned to the assignee of the present application, and incorporated herein, in its entirety, by reference.

The application Ser. No. 15/827,631 is a continuation application of and claims priority to and benefit of U.S. patent application Ser. No. 14/987,616, filed on Jan. 4, 2016, now U.S. Issued U.S. Pat. No. 9,845,130, entitled "AXLE ADAPTER ASSEMBLY" by William M. Becker, assigned to the assignee of the present application, and incorporated herein, in its entirety, by reference.

The application Ser. No. 14/987,616 is a continuation-in-part application of and claims priority to and benefit of U.S. patent application Ser. No. 14/323,934 filed on Jul. 3, 2014, now U.S. Issued U.S. Pat. No. 9,227,690, entitled "AXLE ADAPTER ASSEMBLY" by William M. Becker, assigned to the assignee of the present application, and incorporated herein, in its entirety, by reference.

Embodiments of the present technology relate generally to the field of wheeled vehicles.

BACKGROUND

Today's high performance two-wheeled vehicle is often subjected to extreme riding conditions. Accordingly, riders expect precise steering, robust construction, and improved resistance to torsional and shear forces. The more extreme the riding conditions, the greater is the vehicle's suspension's travel. As the vehicle suspension functions in cooperation with the upper and lower fork legs, it is necessary for there to be as little friction as possible during the telescopic sliding motion of the upper fork legs into the lower fork legs. An axle connects the lower fork legs to each other and helps the lower fork legs remain stable while the vehicle hits corners and jumps.

BRIEF DESCRIPTION OF THE DRAWINGS

Aspects of the present invention are illustrated by way of example, and not by way of limitation, in the accompanying drawings, wherein.

Figure 1A:
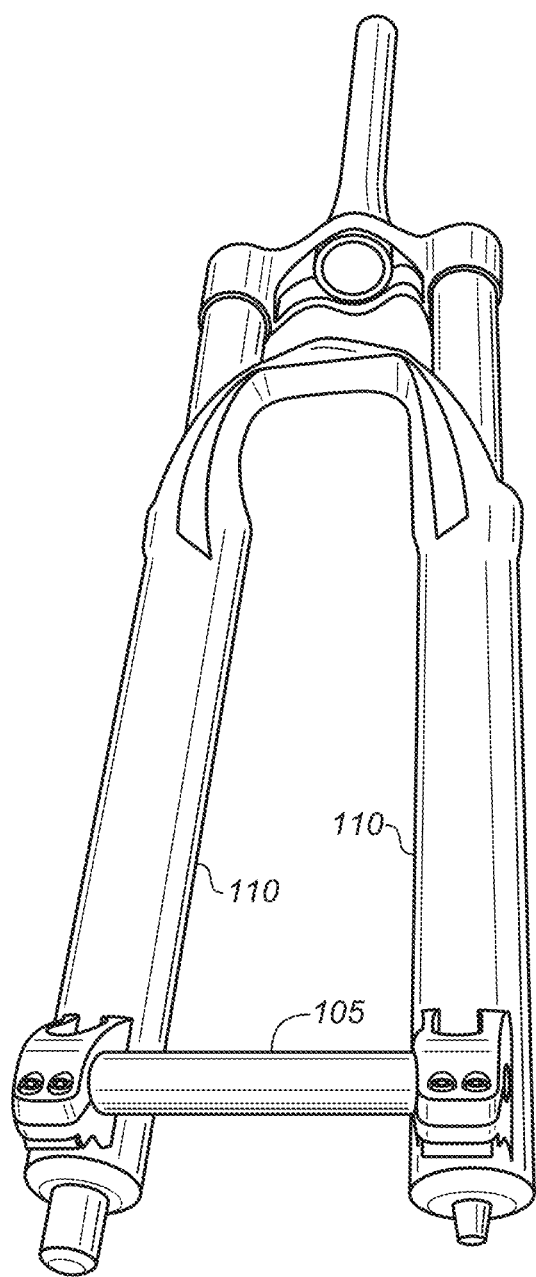
FIG. 1A is a perspective view of upper legs and lower legs of a front fork of a bicycle, wherein the lower legs are connected by an axle.

The drawings referred to in this description should be understood as not being drawn to scale except if specifically noted.

SUMMARY OF EMBODIMENTS

In one embodiment, an axle adapter assembly, configured for enabling conversion of an axle installed on a vehicle to fit different center bore sizes of wheel hubs, includes: an axle configured for coupling dropouts of fork legs of a lower fork; adapters configured for being inserted within the dropouts and engaging an outer surface of the axle and retaining the axle upon engagement; and axle pinch shims configured for being inserted into slits of the dropouts and the adapters, wherein upon the insertion, the adapters are aligned with the dropouts, such that shoulders of the adapters retain edges of a wheel hub of the wheel hubs.

In another embodiment, an adapter, configured for enabling conversion of an axle installed on a vehicle to fit different center bore sizes of wheel hubs, includes: a tube configured for insertion within a dropout of a first fork leg, the tube including: a wall configured for tightly engaging an outer surface of an axle; a first end, wherein the first end includes: a shoulder extending longitudinally beyond an inner surface of the dropout, wherein the shoulder comprises: a lip extension configured for holding an edge of a wheel hub of the wheel hubs; and a second end, a length of the tube being defined from the first end to the second end, wherein at least a portion of an inner surface of the wall at the second end is threaded, the wall including: a lengthwise slit defined therein along a longitudinal axis of the tube from the first end to the second end, wherein the lengthwise slit is configured for receiving a hanging tab of an axle pinch shim, thereby positioning the tube with the dropout such that the lip extension holds the edge of the wheel hub during wheel installation or removal.

In one embodiment, an axle pinch shim, configured for enabling conversion of an axle installed on a vehicle to fit different center bore sizes of wheel hubs, includes: a width configured for enabling the axle pinch shim to be disposed within an opening of a dropout, wherein the dropout includes: a split-clamp pinch bearing defining the opening, the split-clamp pinch bearing includes: a first opposing clamp end; and a second opposing clamp end, wherein the first opposing clamp end and the second opposing clamp end includes aligned pinch bolt holes configured for receiving pinch bolts; and axle pinch shim bolt holes aligned with the pinch bolt holes, the axle pinch shim bolt holes configured for receiving the pinch bolts.

In one embodiment, an axle adapter assembly, configured for enabling conversion of an axle installed on a vehicle to fit different center bore sizes of wheel hubs, includes: an axle including a first end and a second end, the axle configured for coupling fork legs of a suspension for a two-wheeled vehicle, wherein a first fork leg and a second fork leg of the fork legs include a first dropout and a second dropout, respectively; a set of adapters, wherein each adapter of the set of adapters includes a tube configured for insertion within dropouts of the fork legs, said tube including: a wall configured for tightly engaging an outer surface of the axle; a first end, wherein the first end includes: a shoulder extending longitudinally beyond an inner surface of a dropout of the dropouts including the first dropout and the second dropout, wherein the shoulder includes: a lip extension configured for holding an edge of a wheel hub of the wheel hubs; and a second end, a length of the tube being defined from the first end to the second end, the first wall including: a lengthwise slit defined therein along a longitudinal axis of the tube from the first end to the second end, wherein the lengthwise slit is configured for receiving a hanging tab of an axle pinch shim, thereby positioning the tube with the dropout such that the lip extension holds the edge of the wheel hub during said wheel installation or removal; and a set of axle pinch shims, wherein each axle pinch shim of the set of axle pinch shim includes: a width configured for enabling each axle pinch shim to be disposed within an opening of the dropout, wherein the dropout includes: a split-clamp pinch bearing defining the opening, the split-clamp pinch bearing including: a first opposing clamp end; and a second opposing clamp end, wherein the first opposing clamp end and the second opposing clamp end includes aligned pinch bolt holes configured for receiving pinch bolts; and axle pinch shim bolt holes aligned with the pinch bolt holes, the axle pinch shim bolt holes configured for receiving the pinch bolts.

DESCRIPTION OF EMBODIMENTS

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. In some instances, well known methods, procedures, objects, and circuits have not been described in detail as not to unnecessarily obscure aspects of the present disclosure.

This patent application describes the invention in the context of an example embodiment of a front axle for a bicycle and how that example embodiment is mounted to an example front bicycle suspension fork. However, the teachings and scope of the invention are equally applicable to a front or rear wheel of any two-wheeled vehicle.

Overview of Discussion

Embodiments disclosed herein include an axle adapter assembly for enabling axles of varying diameters to be interchangeably installed onto the same fork of a vehicle, using the same dropouts attached to the fork. For example, and referring to FIG. 1A, the axle 105 (shown assembled to the lower fork legs) may be removed and replaced with an axle of a smaller diameter to accommodate a wheel hub with a smaller center bore. Thus, embodiments enable vehicle riders to easily interchange wheels with wheel hubs having different center bore sizes, while also achieving maximum friction reducing benefits.

Figure 1B:
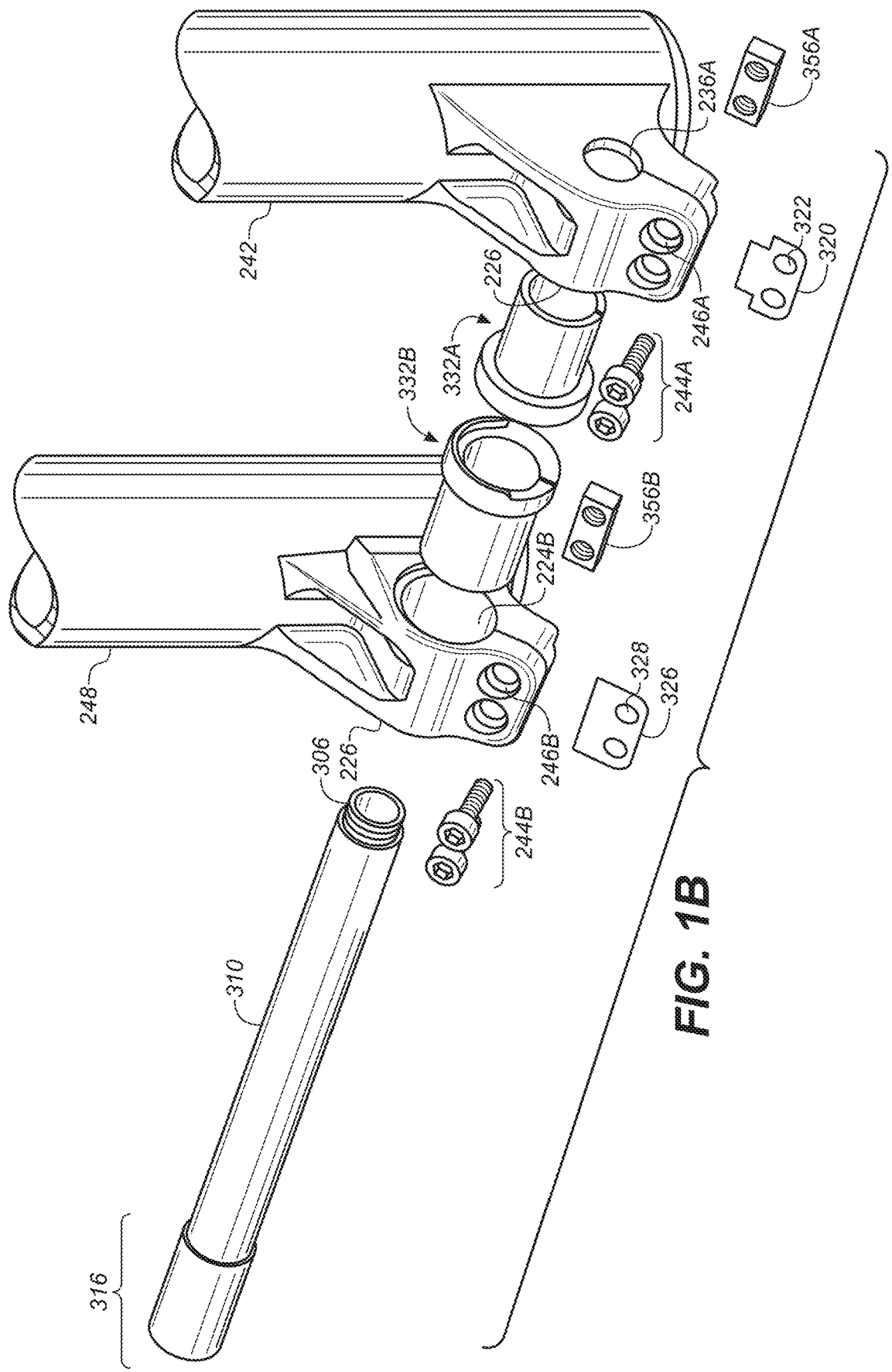
FIG. 1B is an exploded view of an axle adapter assembly in position to convert the front axle to fit a 15 mm wheel hub, in accordance with an embodiment.
Figure 1C:
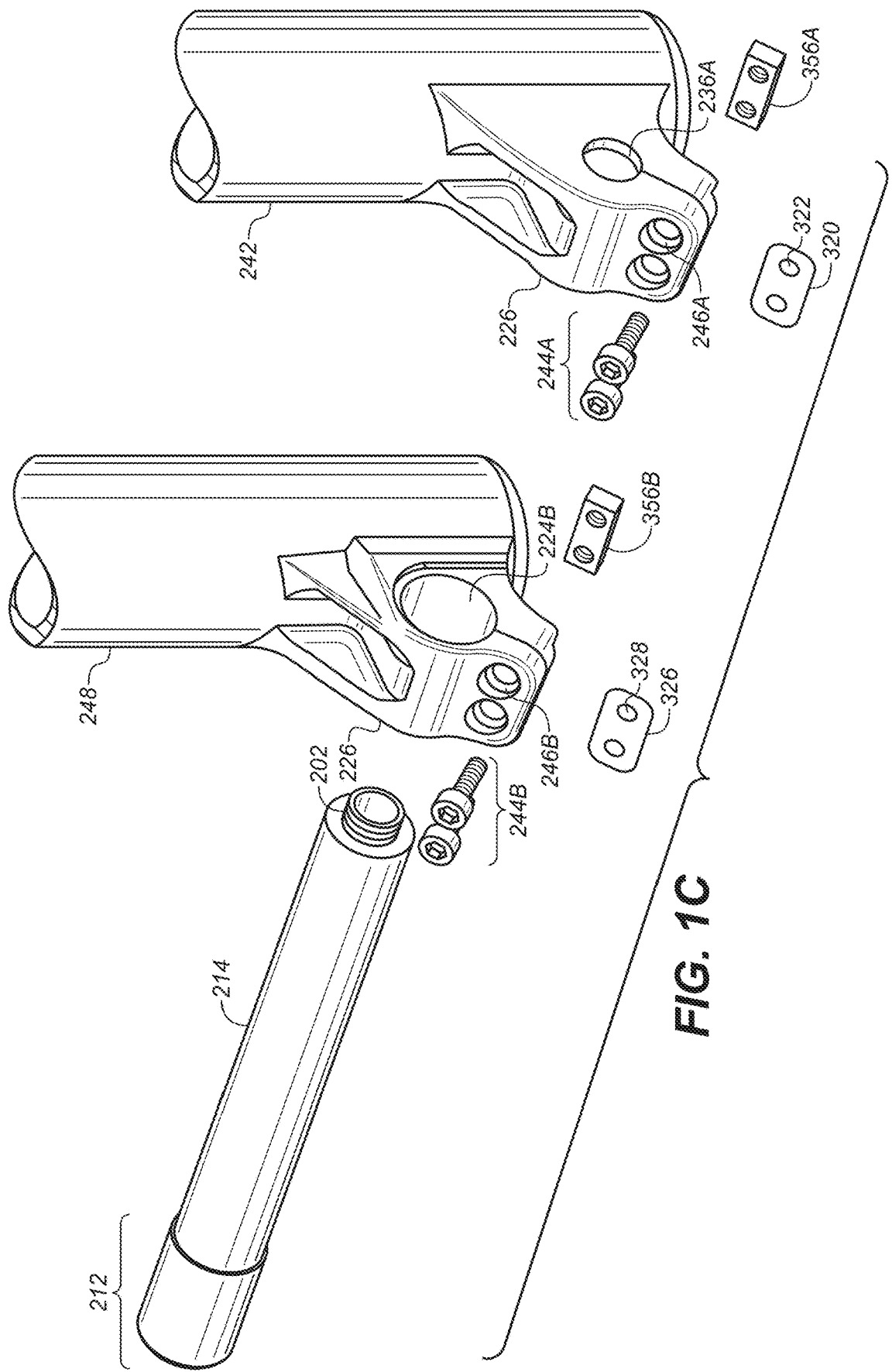
FIG. 1C is an exploded view of an axle adapter assembly in position to convert the front axle to fit a 20 mm wheel hub, in accordance with an embodiment.

With reference to FIGS. 1B and 1C, axle adapter assemblies are shown that enable the conversion of a vehicle's front axle to fit a 15 mm or 20 mm wheel hub, in accordance with an embodiment.

FIG. 1B is a side perspective view of an axle adapter assembly in position to convert the front axle to fit a 15 mm wheel hub, in accordance with an embodiment. First, the pinch bolts, axle pinch bars, and the axle shim plates designed to function with a 20 mm axle are removed from the lower front fork. Then, in one embodiment, the axle adapters are coated with a thin film of multi-purpose lithium based grease or suspension oil. Next, a set (two) of adapters built for 15 mm axles are inserted into the drop outs positioned at a lower front fork. The slit in each of the adapters is aligned with the slit in each of the dropouts. If necessary for alignment, an adapter may be rotated by squeezing it with smooth-jawed pliers to compress the slit and allow the adapter to rotate until aligned. Then, the axle pinch shims designed to operate with a 15 mm axle are installed into their correct dropouts, as shown. Finally, the pinch bolts and the axle pinch bars (see axle pinch bars 356A and 356B of FIG. 3D) are reinstalled.

FIG. 1C is a side perspective view of an axle adapter assembly in position to convert the front axle to fit a 20 mm wheel hub, in accordance with an embodiment. First, the pinch bolts, axle pinch bars and the axle pinch shims are removed. Then, the adapters are squeezed with smooth-jawed pliers, compressing the slits of the adapters while also pulling the adapter toward the opposite dropout for removal. Next, the shim plates designed to operate with the 20 mm axle are inserted into the slits of the dropouts. The pinch bolts and the axle pinch bars (see axle pinch bars 356A and 356B of FIG. 3D) are installed. The 20 mm axle is then inserted into the dropouts.

In one embodiment, and as will be explained herein, the axle adapter assembly includes an axle, adapters and axle pinch shims with hanging tabs.

The discussion begins with a description of a conventional axle assembly for use with a front fork of a bicycle. See FIGS. 2A, 2B, and 2C. Continuing, the discussion turns to a description of embodiments of an axle adapter system, including a description of various components. See FIGS. 3A, 3B, 3C and 3D.

It should be appreciated that a determination of a "left" and/or "right" vehicle component is resolved from the vehicle rider's perspective.

Conventional Axle Assembled onto Lower Legs of Front Fork

Figure 2A:
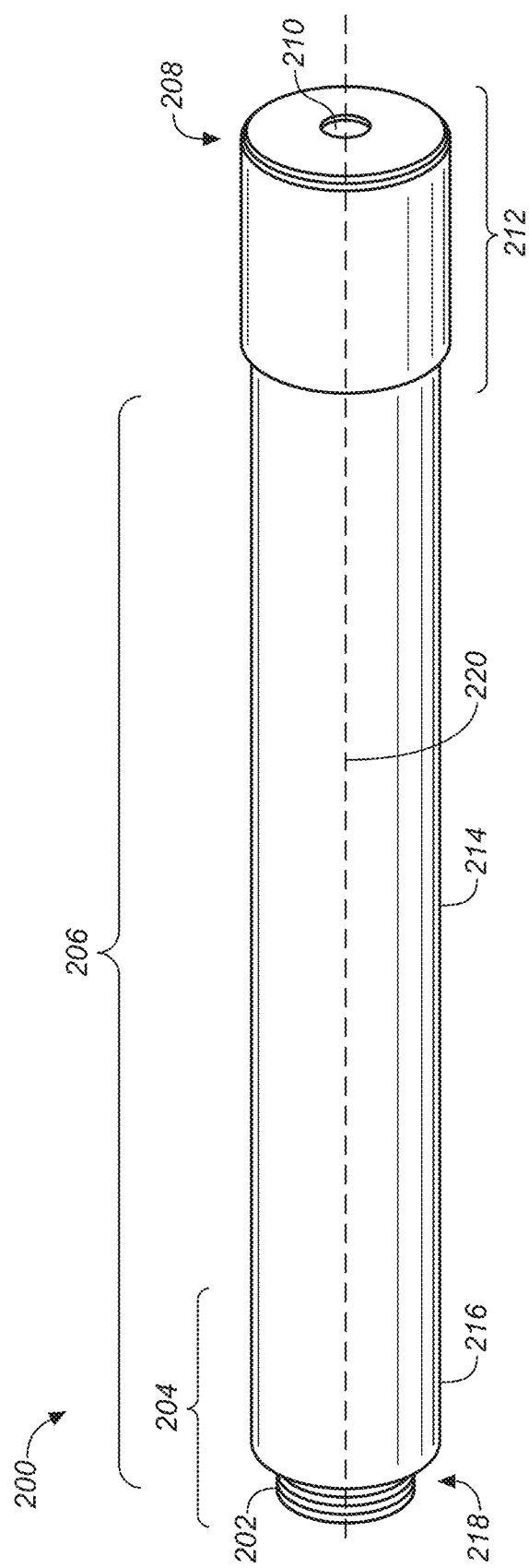
FIG. 2A is a side perspective view of an axle for use in a conventional axle assembly.

FIG. 2A shows a side perspective view of an axle 200 for use in a conventional axle assembly. The axle 200 includes an axle body 214 having a first end 218 and a second end 208 connected by an elongated tubular body portion 206. Positioned between the first end 218 and the second end 208 are a first bearing portion 204 and a second bearing portion 212 for mounting in first and second dropouts, respectively (see discussion of FIGS. 2B and 2C below). The axle body 214 is typically forged or machined from a single solid metallic work piece. Typically, the metallic work piece will be a piece of aluminum. However, other materials may be used. The outer diameter of the axle body 214, for example, is 19.99 mm.

The first bearing portion 204 includes threads 202 positioned adjacent to the first end 218 of the axle body 214 and a first smooth bearing surface 216 inwardly spaced from the threads 202 and the first end 218 of the axle body 214. The threads 202 are for mounting in the complementary threads in a corresponding threaded first dropout (see FIGS. 2B and 2C).

Figure 2B:
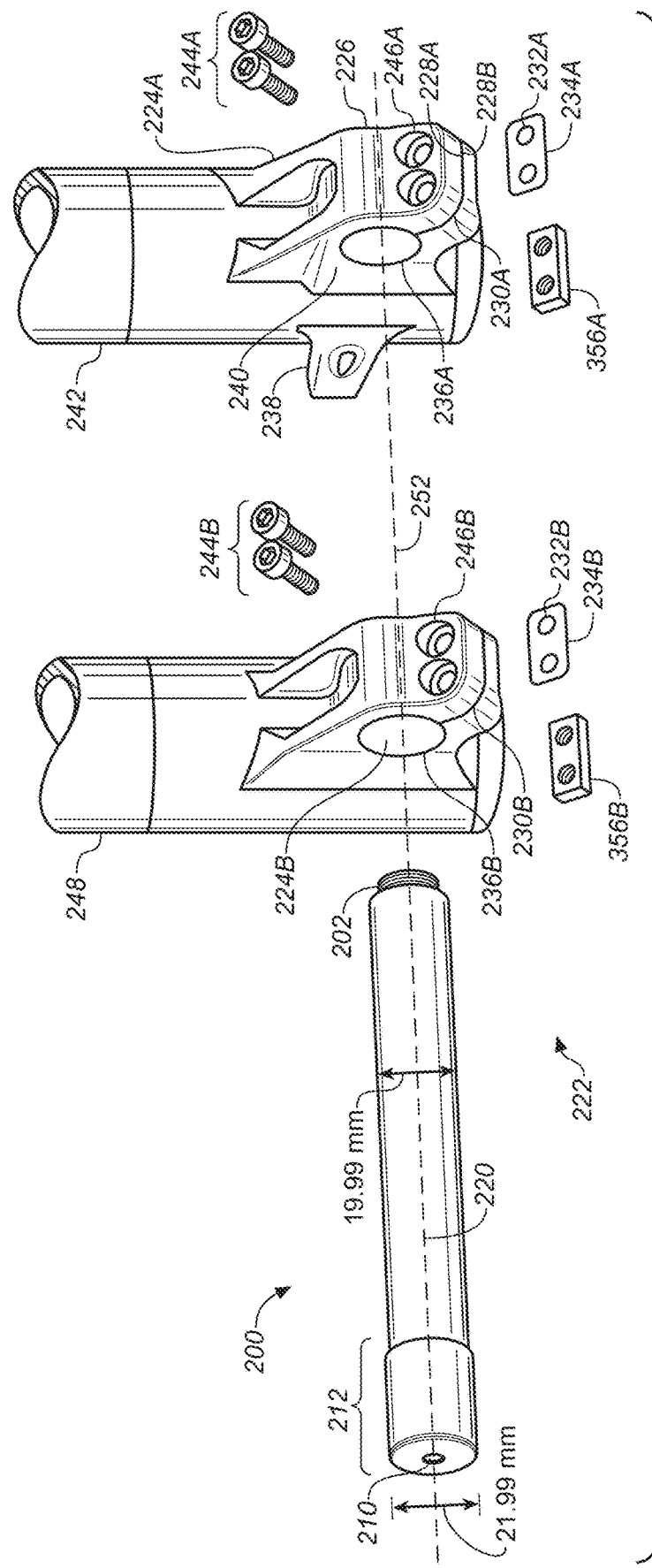
FIG. 2B is a side perspective view of an unassembled conventional axle assembly.
Figure 2C:
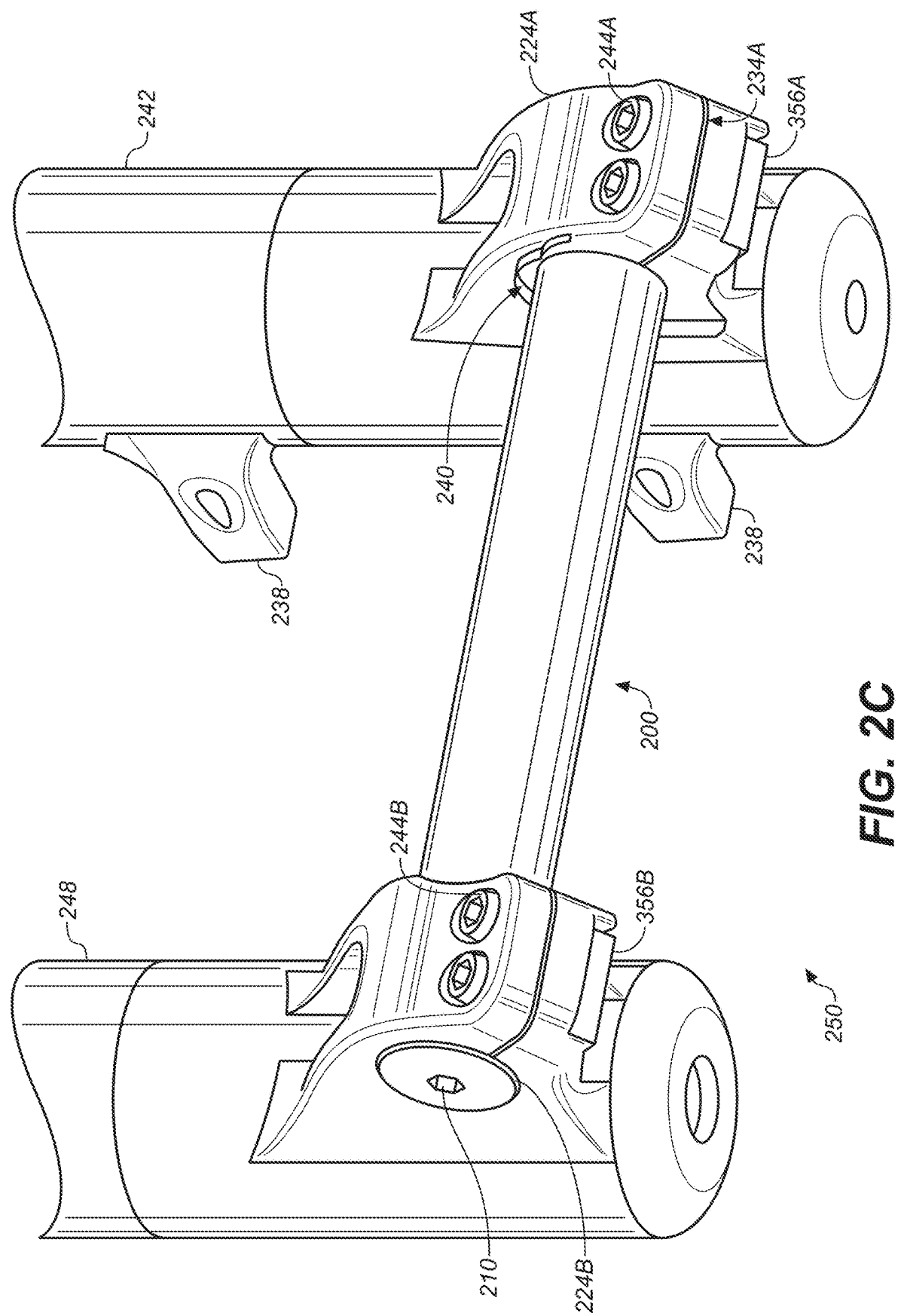
FIG. 2C is a side perspective view of an assembled conventional axle assembly.

The second bearing portion 212 includes an enlarged diameter (relative to the first smooth bearing surface 216) second smooth bearing surface for insertion into a corresponding non-threaded and smooth second dropout (see discussion of FIGS. 2B and 2C). The outer diameter of the second bearing portion 212, for example, is 21.99 mm.

The second end 208 of the axle body 214 includes a turn mechanism 210, into which a turning tool may be inserted to cause the turn mechanism 214 to move in the guided direction. Upon movement of the turning tool in the turn mechanism 214, the axle body 214 rotates about its longitudinal axis 220 so that the threads 202 of the axle body 214 may interlock with the threads 202 of the first dropout. For example, the turning tool may be a 5 mm Allen wrench or hex key, and the turn mechanism 214 may be shaped to receive the Allen wrench or hex key.

FIG. 2B is a side perspective view of an unassembled conventional axle assembly 222, including the axle 200 of FIG. 2A. FIG. 2C is a side perspective view of a conventional assembled axle assembly 250. Together, FIGS. 2B and 2C show an example conventional axle 200 assembled onto lower legs of a fork. For clarity, such conventional components as the upper portions of the suspension fork, the tire, the wheel and other associated hardware have been omitted from FIGS. 2A-2C.

In FIGS. 2A and 2B, the longitudinal axis 220 of the axle 200 is aligned with the longitudinal axes 252 of the first dropouts 224A and the second dropouts 224B of the suspension fork. The first dropouts 224A and the second dropouts 224B include split-clamp pinch bores 236A and 236B in the left and the right lower fork legs 242 and 248, respectively. The split-clamp pinch bores 236A and 236B substantially surround the axle 200 (when the axle 200 is inserted) subject to the small slits 230A and 230B formed by the space between opposing clamp ends 228A and 228B, respectively, that allows the diameters of the split-clamp pinch bores 236A and 236B to be varied to clamp or release the axle 200 within the split-claim pinch bores 236A and 236B.

The split-clamp pinch bore 236B will have a completely smooth bearing-like surface finish for engagement with the smooth bearing surface of the axle 200. The split-clamp pinch bore 236A will have a partially smooth bearing-like finish for engagement with the bearing surface of the axle 200 and threads 202 complementary to the threads 226 disposed within the split-clamp pinch bore 236A.

The inner diameter of the first dropout 224A, for example, is 20 mm, while the inner diameter of the second dropout 224B, for example, is 22 mm. Of note, the first bearing portion 204 and the second bearing portion 212 are just a little undersized respective to the first dropout 224A and the second dropout 224B, respectively, such that the first bearing portion 204 and the second bearing portion 212 fit smoothly, and yet with little clearance room, into and between the first dropout 224A and the second drop out 224, respectively.

Additionally, adjacent to the inner portions of the first dropout 224A and the second drop out 224B are the left shoulder 240 and the right shoulder (not shown due to the drawing perspective), respectively. The left shoulder 240 and right shoulder provide a ledge for which the wheel hub may rest while the axle 200 is being slip-fit through the first and second dropouts, and 224A and 224B, respectively.

In FIG. 2C, the axle 200 has been inserted through the split-clamp pinch bores 236A and 236B. The axle 200 is then rotated, using for example, the turning tool placed in the turn mechanism 210, until the complementary threads 226 of the split-clamp pinch bore 236A capture the threads 202 of the axle 200. The number of turns needed to accomplish a tight fit between the axle body 214 and the first dropout 224A depends upon the pitch and length of the complementary threads 226. Typically, the rider can feel when the threads 202 of the axle 200 and the threads 226 of the split-clamp pinch bore 236A (or, the right side dropout [second dropout 224A]) have become properly engaged. When the axle 200 is turned to be tightened to the extent possible, a "registration" occurs. During this registration, the left shoulder 240 tightens up the wheel hub against the left shoulder 240 of the first dropout 224A precisely as designed, such that the rotor is precisely located relative to a caliper into which the rotor slid. The disc brake mounts 238 hold the caliper for the disc brake. It is necessary for the wheel hub to be precisely placed in relation to the lower leg of the fork, such that the disc brakes do not scuff and scrape the tire during its rotation.

With reference to FIGS. 2B and 2C, before or after a turning tool is used to turn the axle 200 via the turn mechanism 210, the axle shim plates 234A and 234B may be inserted into the slits 230A and 230B, respectively. The slits 230A and 230B may have a width of, for example, 40⁄1000 inches wide. The axle shim plate bolt holes 232A and 232B line up with the bolt holes 246A and 246B, respectively.

The M5 bolts 244A and 244B are then inserted into the (casting) bolt holes 246A and 246B, respectively, and thus also inserted into the axle shim plate bolt holes 232A and 232B. The M5 bolts 244A on the left lower fork leg 242 are tightened first, and then the M5 bolts 244B on the right lower fork leg 248 are tightened. Once the M5 bolts 244A on the left lower fork leg 242 are tightened, the right lower fork leg 248 is floating at its lowest friction point. Once the M5 bolts 244B on the right lower fork leg 248 are tightened, the floating aspect is removed, and the upper and lower fork legs remain at their lowest friction point with respect to each other. For example, as known, the upper fork legs telescopically slide in and out of the lower fork legs. The clearance distance between the outer surface of the lower fork legs and the inner surface of the upper fork legs is minimal and allows for movement of the upper front fork legs with respect to the lower front fork legs. Without the tightening of the left shoulder 240 against the wheel hub via the turning tool being applied to the turn mechanism 210, the inner surface of the upper front fork legs will be non-parallel with the outer surface of the lower front fork legs, creating contact between the surfaces, and thus creating friction. By tightening the left shoulder 240 against the wheel hub, the surfaces of the upper and lower front fork legs become substantially parallel (referring to completely parallel or almost parallel) with each other. By tightening the M5 bolts, the surfaces of the upper and lower front fork legs remain substantially parallel with each other and at their lowest friction point.

The M5 pinch bolts 244A and 244B may be tightened to a prescribed torque of, for example, 19 inch pounds. Upon tightening the M5 pinch bolts 244A and 244B, the slits 230A and 230B, respectively, squeeze closed to a width of, in one example, about 10/1000 inches wide. The axle shim plates 234A and 234B function to prevent the over-tightening of the M5 pinch bolts 244A and 244B, respectively, and therefore damaging and/or destroying the casting of the bolt holes 246A and 246B.

While the previous discussion has been in the context of installing the axle 200, one skilled in the art would recognize that in the context of un-installing the axle 200, the above process would merely be reversed.

Example Axle Adapter Assembly

Many times, bicycle riders desire to switch out one wheel size for another wheel size, each having wheel hubs with different center bore sizes. For example, downhill mountain bikes often have a wheel hub standard size that requires an axle standard size of either 20 mm in width by 110 mm in length or 15 mm in width by 100 mm in length. The smaller wheel hub may be lighter and therefore more desired in certain riding circumstances. The axle adapter assembly described herein is designed, in one embodiment, to be installed onto the lower fork legs such that a smaller standard wheel hub is operable in the space previously occupied by the larger standard wheel hub, or vice versa.

Figure 3A:
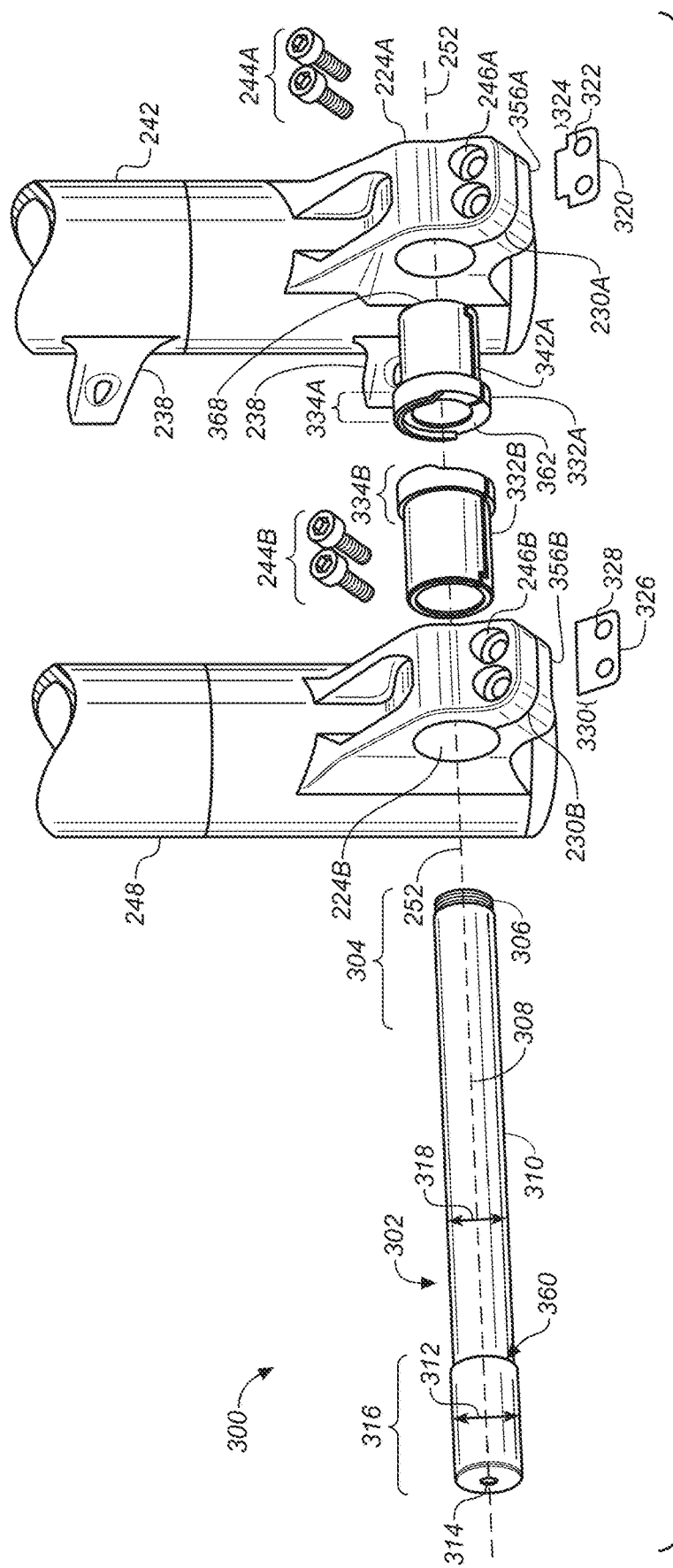
FIG. 3A is a side perspective view of an unassembled axle adapter assembly in relation to the lower fork legs and axle, in accordance with an embodiment.
Figure 3B:
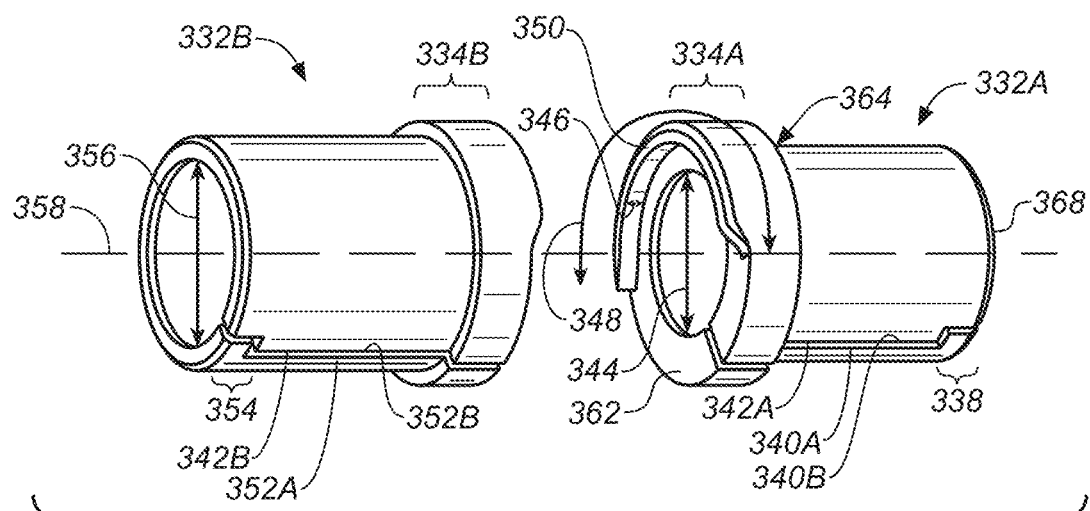
FIG. 3B is a side perspective view of a left adapter and a right adapter of the axle adapter assembly, in accordance with an embodiment.
Figure 3C:
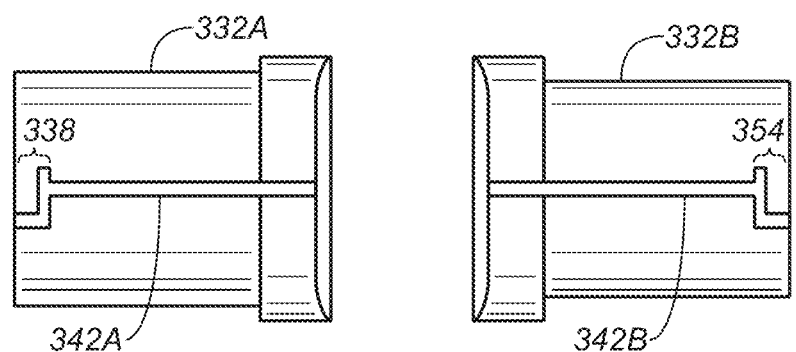
FIG. 3C is a top perspective view of the slit of the left adapter and the slit of the right adapter of FIG. 3B, in accordance with an embodiment.
Figure 3D:
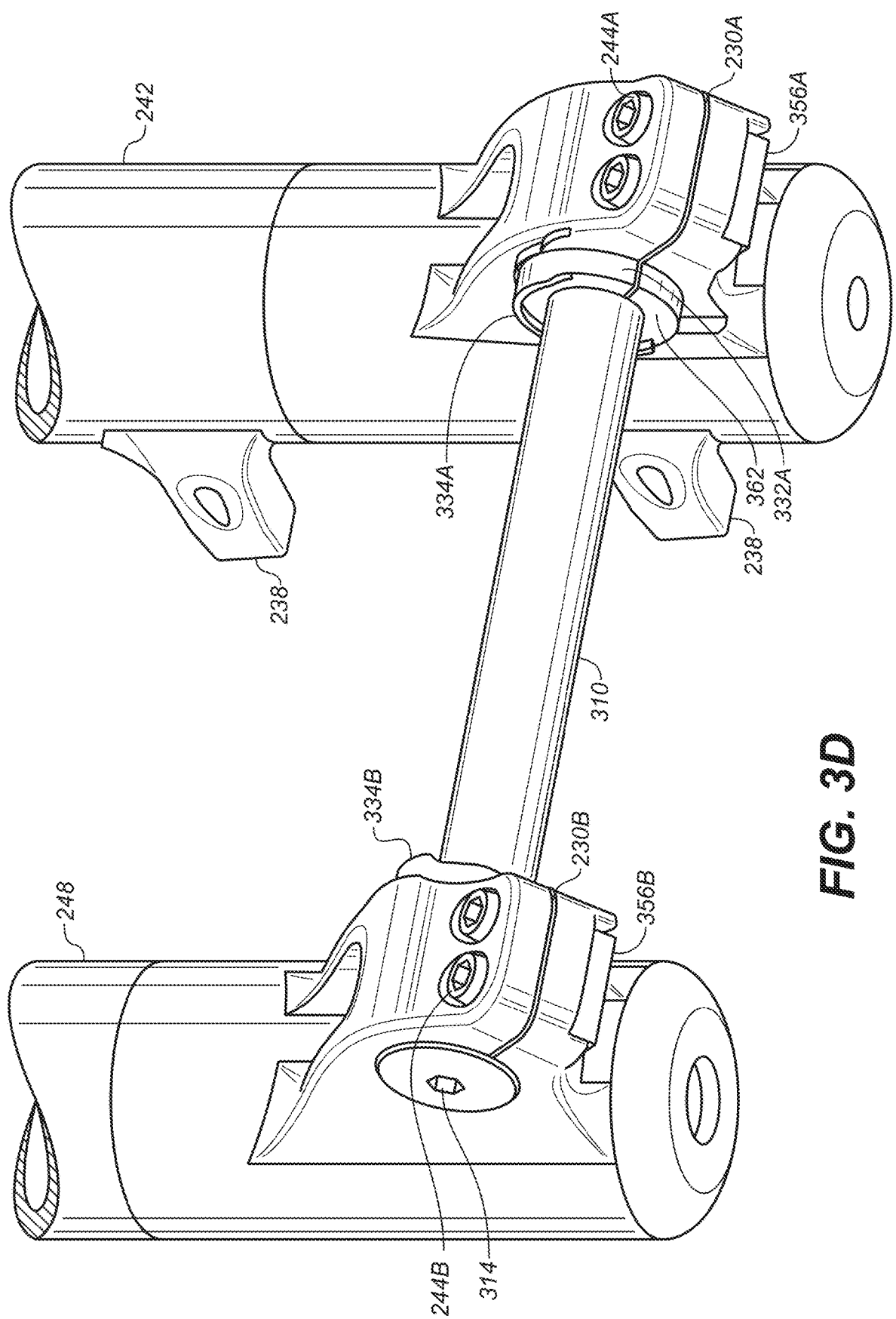
FIG. 3D is a side perspective view of an assembled axle adapter assembly in relation to the lower fork legs and axle, in accordance with an embodiment.

FIG. 3A depicts a side perspective view of an unassembled axle adapter assembly in relation to the lower fork legs and axle 302, in accordance with an embodiment. FIG. 3B is a side perspective view of a left adapter 332A and a right adapter 332B of the axle adapter assembly, in accordance with an embodiment. FIG. 3C is a top perspective view of the slit 342A of the left adapter 332A and the slit 342B of the right adapter 332B of FIG. 3B, in accordance with an embodiment. FIG. 3D is a side perspective view of an assembled axle adapter assembly in relation to the lower fork legs and axle 302, in accordance with an embodiment.

Of note, the features of the lower fork shown in FIG. 2B are the same as those features of the lower fork shown in FIG. 3A. Additionally, the axle 302 shown in FIG. 3A includes the same features as the axle 200 shown in FIGS. 2A and 2B, except that the axle 200 of FIGS. 2A and 2B has dimensions that are greater in length and width than the dimensions of the axle 302 of FIG. 3A, as will be discussed in detail below.

Briefly, embodiments of the axle adapter system, according to one embodiment, includes an axle 302, a left adapter 332A, a right adapter 332B, a left axle pinch shim 320 and a right axle pinch shim 326. As will be described herein, the axle 302 is of smaller dimensions than the axle 200 as described with respect to FIGS. 2A-2C. The left adapter 332A and the right adapter 332B include slits 342A and 342B, respectively, having a jogging pattern 338 and 354, respectively, which functions to prevent the left and right axle pinch shims 320 and 326, that are inserted into the left and right slits 230A and 230B, respectively, from slipping out of the slits 230A and 230B while the axle 302 is being removed and/or replaced. The left and right axle pinch shims 320 and 326 include left and right hanging tabs, 324 and 330, respectively; the left and right hanging tabs, 324 and 330, respectively, are that portion of the axle pinch shims 320 and 326, respectively, that are inserted into the left and right slits 342A and 342B, respectively. Of note, the left axle pinch shim 320 and the right axle pinch shim 326 are of a different shape so that they may be distinguished from each other.

With reference to FIGS. 2A and 3A-3D, a more particular description and process for implementing embodiments follows. Once the axle 200 is removed from the first and the second dropouts 224A and 224B, the left 332A and the right adapter 332B are inserted into the first and the second drop outs, 224A and 224B, respectively. An enlarged view of the left adapter 332A and the right adapter 332B is shown in FIG. 3B. The right adapter 332B is tubular in shape and is configured to surround the axle 302 subject to the slit 342B formed in the space between opposing clamp ends 352A and 352B that allows the diameter of the right adapter 332B to be varied to clamp or release the axle 302 within the right adapter 332B. The right adapter 332B will have a completely smooth bearing-like inner surface finish for engagement with the smooth second bearing portion of the axle 302.

In one embodiment, the right adapter 332B has an inner diameter 356 of 17 mm and an outer diameter of 21.99 mm. Thus, the right adapter 332B is of such a size as to slide into the second dropouts 224B that has an inner diameter of 22 mm. The inner diameter 356, 17 mm, of the right adapter 332B is of such as size and to receive the second bearing portion 316 of the axle 302 having an outer diameter 312 of 16.99 mm. The thickness of the right adapter 332B, comprising material between the inner surface and the outer surface is such to enable the right adapter 332B to be formed with an inner diameter 356 of 17 mm and an outer diameter of 21.99 mm. It should be noted that the dimensions described herein with regard to the right adapter 332B, as well as the axle 302 and the second dropout 224B, are examples only. The right adapter 332B, the axle 302 and the second dropout 224B may have different dimensions, while enabled to follow the principals of operation described herein.

The right adapter 332B includes a right shoulder 334B that is annularly positioned on the left side of the right adapter 332B. The right shoulder 334B is designed to hold an edge of a wheel hub, thereby also helping to hold the tire attached to the wheel hub. The right shoulder 334B includes a lip extension (not shown with respect to the right adapter 332B, but shown with respect to the left adapter 332A) radially and annularly positioned on about half of the right shoulder 334B. The dimensions of the length and width of the lip extension are designed to hold an edge of a wheel hub, wherein the axle 302 is slip-fit through the center bore of the wheel hub.

The right adapter 332B also has a slit 342B disposed therein, with a jogging pattern 354 disposed toward the right side of the right adapter 332G. An enlarged view of the slit 342B of the right adapter 332B is shown in FIG. 3C. As seen, a portion of the slit 342B is straight and runs along the longitudinal axis 358 of the right adapter 332B and hence the longitudinal axis 252 of the second dropout 224B. The right axle pinch shim 326 has a right hanging tab 330 and right pinch shim bolt holes 328.

After the left and right adapters, 332A and 332B, respectively, are inserted into the first and second dropouts, 224A and 224B, respectively, the right axle pinch shim 326 is inserted into the slit 230B (or the left axle pinch shim 320 is inserted into the slit 230A), such that the right pinch shim bolt holes 246B are positioned at the right bolt holes 246B and the right hanging tab 330 is inserted into the straight portion of the right slit 230 of the right adapter 332B. By inserting the right hanging tab 330 into the right slit 230 of the right adapter 332B, the right adapter 332B is positioned precisely such that the wheel hub is held, via the wheel hub edges, at a predetermined angle relative to the fork and disc brake mounts. As will be explained below, the same procedure regarding inserting axle pinch shims into slits of the dropouts applies to inserting the left axle pinch shim 320 into the slit 230A of the first dropout 224A.

The right jogging pattern 354 of the right adapter shown in FIG. 3C, is shown positioned at the right side of the right adapter 332B. Once the right hanging tab 330 of the right axle pinch shim 326 is inserted into the right slit 230B of the right adapter 332B, during the insertion of the axle 302 through the right and left adapters, 332B and 332A (and hence, also insertion through the second and first dropouts, 342B and 342A, respectively), the jogging pattern 354 keeps the right adapter 332B from sliding inwards and to the left toward the wheel hub and out of the right dropout 224B. Further, the jogging pattern 354 keeps the right axle pinch shim 326 from sliding out of the slit 230B and to the right, before the right M5 pinch bolts 244B are screwed into the right bolt holes 246B.

Thus, in review, the axle 200 is taken out of the first and second dropouts 224A and 224B, respectively, the left adapter 332A and the right adapter 332B are inserted into the first and second drop outs, 224A and 224B, respectively, the left axle pinch shim 320 and the right axle pinch shim 326 are placed in the slit 230A and 230B, respectively, and the left hanging tab 324 and the right hanging tab 330 are placed in the left slit 242A and the right slit 242B, respectively, of the left adapter 332A and the right adapter 332B, respectively.

Then, the wheel hub of the tire is placed such that the outer edges of the wheel hub rest on the left shoulder 334A and the right shoulder 334B of the left adapter 332A and the right adapter 332B, respectively. More particularly, in one embodiment, the outer edges of the wheel hub rest on the inner surfaces of the lip extensions of the left shoulder 334A and the right shoulder 334B. Next, the first bearing portion 304 of the axle 302 is inserted first into and through the right adapter 332B and then into the left adapter 332A.

The left adapter 332A is tubular in shape and is configured to surround the first bearing portion 304 of the axle 302 subject to the left slit 342A formed in the space between opposing clamp ends 340A and 340B that allow the diameter of the left adapter 332A to be varied to clamp or release the axle 302 within the left adapter 332A. The left adapter 332A will have a completely smooth bearing-like inner surface finish for engagement with the smooth first bearing portion 304 of the axle 302.

In one embodiment, the left adapter 332A has an inner diameter 344 of 15 mm and an outer diameter of 19.99 mm. Thus, the left adapter 332A is of such a size as to slide into the first dropouts 224A having an inner diameter of 20 mm. The inner diameter 344 of 15 mm, of the left adapter 332A is of such as size and to receive the first bearing portion 304 of the axle 302 having an outer diameter 318 of 14.99 mm. The thickness of the left adapter 332A, comprising the material between the inner surface and the outer surface is such as to enable the left adapter 332A to be formed with an inner diameter 344 of 15 mm and an outer diameter of 19.99 mm. It should be noted that the dimensions described herein with regard to the left adapter 332A, as well as the axle 302 and the first dropout 224A, are examples only. The left adapter 332A, the axle 302 and the first dropout 224A may have different dimensions, while also enabled to follow the principals of operation described herein.

The left adapter 332A includes a left shoulder 334A that is annularly positioned on the right side of the left adapter 332A. The left shoulder 334A is designed to hold an edge of a wheel hub, thereby also helping to hold the tire attached to the wheel hub. The left shoulder 334A includes a lip extension 350 (shown in FIG. 3B) radially and annularly positioned on about half of the left shoulder 334A. The dimensions of the length and width of the lip extension 350 are designed to hold an edge of a wheel hub during wheel installation and removal, wherein the axle 302 is slip-fit through the wheel hub. Additionally, the left shoulder 334A includes a wheel hub receiving surface 362 which is flat, includes a portion of the outer surface of the left shoulder 334A that is not occupied by the lip extension, and the plane of the surface of the wheel hub receiving surface 362 is positioned perpendicular to the longitudinal axis 252. As will be explained, this wheel hub receiving surface 362 of the left shoulder 334A is designed to be pulled/pushed against the outer side of the wheel hub during and after installation, wherein the wheel hub is held in place during installation with the aid of the lip extensions of both the right adapter 332B and the left adapter 332A.

Of note, the left adapter 332A has a length that is smaller than the length of the first (left) dropout 224A. As described herein, the first dropout 224A includes threads 226. It is important to note that the length of the left adapter 332A is less than the length of the first dropout 224A such that the end annular surface of the left adapter 224A does not reach/touch the threads 226 when installed. In other words, during and after installation of the left adapter 332A into the first dropout 224A, a gap exists between the end annular surface 368 of the left adapter 332A and the threads 226. The length of the left adapter 332A as compared to the length of the first dropout 224A is designed to create this gap upon and after installation to ensure that all components are precisely tightened with a snug fit. More particularly, the gap is designed such that when the wheel's hub presses against the wheel hub receiving surface 362 and the back surface edge 364 of the left shoulder 334A is enabled to press against the right outer surface 366 of the first (left) dropout 224A. Such a design ensures that the left adapter 332A is inserted into the first dropout 224A as far as it can be inserted during installation, wherein all involved surfaces (e.g., the outer surface of the wheel's hub, the wheel hub receiving surface 362, the back surface edge 364 of the left shoulder 334A and the right outer surface 366 of the first dropout 224A) are pressed snugly against each other. The gap ensures that the end annular surface 368, upon tightening of the axle 302, does not connect with the threads 226. If the end annular surface 368 did touch/overlap the threads 226, then it is possible that the back surface edge 364 of the left adapter 332A would be prevented from being snugly pressed against the outer surface 366 of the first dropout 224A.

The left adapter 332A also has a slit 342A disposed therein, with a jogging pattern 338 disposed toward the left side of the left adapter 332A. An enlarged view of the slit 342A of the left adapter 332A is shown in FIG. 3C. As seen, a portion of the slit 342A is straight and runs along the longitudinal axis 358 of the left adapter 332A and hence the longitudinal axis 252 of the first dropout 224A. The left axle pinch shim 320 has a left hanging tab 324 and left pinch shim bolt holes 322.

After the left adapter 332A and the right adapter 332B are inserted into the first dropout 224A and the second dropout 224B, respectively, the left axle pinch shim 320 is inserted into the slit 230A, such that the left pinch shim bolt holes 322 are positioned at the left bolt holes 246A and the left hanging tab 324 is inserted into the straight portion of the left slit 342A of the left adapter 332A. By inserting the left hanging tab 324 into the left slit 342A of the left adapter 332A, the left adapter 332A is positioned precisely such that the wheel hub is held, via the wheel hub edges, at a predetermined angle relative to the lower front fork and disc brake mounts 238.

The left jogging pattern 338 of the left adapter 332A shown in FIG. 3C, is shown positioned at the left side of the left adapter 332A. Once the left hanging tab 324 of the left axle pinch shim 320 is inserted into the left slit 342A of the left adapter 332A (and hence also inserted into the slit 230A of the first dropout 224A), during the assembly of the axle 302 through the second dropout 224B and first dropout 224A, the left jogging pattern 338 keeps the left adapter 332A from sliding inwards and to the right toward the wheel hub and out of the first dropout 224A. Further, the left jogging pattern 338 keeps the left axle pinch shim 320 from sliding out of the slit 230A and to the left, before the left M5 pinch bolts 244A are screwed into the left pinch bolt holes 246A.

Of note, in one embodiment, the 15 mm axle 302 uses and threads into the thread 226 of the lower fork leg. Hence, in one embodiment, the 20 mm and the 15 mm axles have a common thread size that is slightly smaller than the 15 mm axle outer diameter and the thread is a $9/16$ to $9/24$ inch UNEF thread.

With reference to FIG. 3A, it is noted that as the axle 302 includes an axle body 310, having a first end a first bearing portion 304 which includes the threads 306, and having at a second end opposite the first end a second bearing portion 316 having a turn mechanism 314. In one embodiment, a portion of the axle 302, from the position at which the threads 306 meet the non-threaded portion of the axle body 310 to the location at which the second bearing portion 316 is indicated, has an outer diameter of 318 of 14.99 mm. The outer diameter 312 of the second baring portion 316, in one embodiment, is 16.99 mm. The difference between the sizes of the outer diameter 318 and the outer diameter 312 of the second bearing portion 316 exposes the side surface of the second bearing portion 316, and is referred to as the second bearing portion side surface 360, representing the "step-up" between the smaller outer diameter 318 and the larger outer diameter 312. As will be explained below, this second bearing portion side surface 360 plays a functional role during the installation of an axle and a wheel onto a vehicle's lower fork, in accordance with embodiments.

Thus, after the right axle pinch shim 326 and the left axle pinch shim 320 are inserted into the slits 230B and 230A, respectively, and into the right slit 342B and left slit 342A of the right adapter 332B and the left adapter 332A, respectively, the turning tool engages the turn mechanism 314 such that the axle 302 turns, and the threads 306 interlock with the threaded portion 226 of the left dropout 224A. Upon this interlocking, the left shoulder 334A of the left adapter 332A is pulled tight against the wheel hub. (Of note, in one embodiment, the M5 pinch bolts 244A and/or the M5 pinch bolts 244B are inserted at least partially into the pinch bolt holes 246A and/or 246B, before the axle 302 is turned such that the threads 306 of the axle 302 engage the threaded portion 226 of the first dropout 224A.)

In one embodiment, after the wheel hub is pulled tight against the first dropout 224A via the process of screwing the threads 306 into the threaded portion 226 of the left dropout 224A, the left M5 pinch bolts 244A and the right M5 pinch bolts 244B pass through the left and right pinch bolt holes 246A and 246B, respectively, such that the heads of the left and right M5 pinch bolts 244A and 244B are snug against the base of the left and right pinch bolt holes 246A and 246B, respectively. The M5 pinch bolts 244A and 244B thread into the axle pinch bar 356A and 356B, respectively.

Tightening these four M5 pinch bolts 244A and 244B reduces the split clamp gap at the slit 230A (of the first dropout 224A), left slit 342A of the left adapter 332A, slit 230B (of the second dropout 224B) and the right slit 342B of the right adapter 332B, which then rigidly clamps the axle 302.

Of particular note, once the threads 306 become engaged with the threads 226 of the first dropout 224A, and second bearing portion side surface 360 is tensioning the outside surface of the wheel hub against the wheel hub receiving surface 262 of the left adapter 332A as described above, the right adapter 332B is left to float freely in relation to the outer diameter 312 of the axle 302, thereby enabling the fork leg assembly, and more particularly, the lower fork legs float to move into a position that attains the lowest state of friction in relation to the upper fork legs slidably disposed therein. Once this lowest state of friction is attained, then the right M5 pinch bolts 244B are tightened, in order to maintain this positioning. Since the second bearing portion side surface 360 is that surface which contacts the wheel's hub, a gap between the inner surface of the right shoulder 334B and the wheel hub is maintained to enable the right adapter 332B to freely float.

The axle 302 of FIG. 3A includes the same features as the axle 200 described with respect to FIGS. 2A-2C, with the exception that the axle 302 has dimensions different from the axle 200. For example, the outer diameter 318 of the axle body 310, in one embodiment, is 14.99 mm, and the outer diameter 312 of the second bearing portion 316 is 16.99 mm. These dimensions are smaller than the dimensions of the axle 200 described with respect to FIGS. 2A-2C. As seen in FIG. 3A, the axle 302 includes the axle body 310 with an outer diameter 312 having a width of 14.99 mm, a first bearing portion 304 that includes the threads 306 and a second bearing portion 316 with an outer diameter 312 of 16.99 mm and having a turn mechanism 314 at the end thereof.

The threads 306 of the first bearing portion 304 are for mounting in complementary threads (the threaded portion 226) in a corresponding threaded portion of the first dropout 224A (left side dropout). Thus, using a turning tool to the turn mechanism 314 enables the interlocking between the threads 306 into the threads 226 of the first dropout 224A.

As with the axle 200 of FIGS. 2A-2C, the longitudinal axis 308 of the axle 302 is aligned with the longitudinal axes 252 of the first and second dropouts 224A and 224B, respectively, of the suspension fork. The first and second dropouts 224A and 224B include the split-clamp inch bearings as described with respect to FIGS. 2A-2C.

With reference to FIGS. 3A-3D, an overview of the process of installing the axle adapter assembly onto a bicycle is described below. The original axle is removed from the first dropout 224A and the second dropout 224B. The left adapter 332A and the right adapter 332B are inserted into the first dropout 224A and the second dropout 224B, respectively. The left adapter 332A and the right adapter 332B are positioned such that the left shoulder 334A and the right shoulder 334B face inwards and toward each other. The left and right axle pinch shims, 320 and 326, are inserted into the slits, 230A and 230B, respectively. The left hanging tab 324 and the right hanging tab 330 are inserted into the slit 342A of the left adapter 332A and the slit 342B of the right adapter 332B, respectively, thereby adjusting the positioning of the left adapter 332A and right adapter 332B such that the left shoulder 334A and the right shoulder 334B are able to receive the edges of the wheel hub. The tire with the wheel's hub is placed between the left front lower fork leg 242 and the right lower front fork leg 248, with the edges of the wheel's hub resting on the left shoulder 334A and the right shoulder 334B and the lip extensions thereof (e.g., lip extension 350 of the left shoulder 334A [the lip extension is not shown in FIG. 3B due to the perspective shown.]), of the left adapter 332A and the right adapter 332B, respectively. The first end of the axle 302, with the threads 306, is inserted into the right adapter 332B installed within the second dropout 224B, and then inserted into the left adapter 332A installed within the first dropout 224A until the threads 306 meet the threaded portion 226. A turning tool is used to turn the turn mechanism 314, such that the axle 302 is rotated along the longitudinal axis 308 and the threads 306 engage with the threaded portion 226. The axle 302 is rotated until the second bearing portion side surface 360 is tightened against the right side of the wheel's hub, which tightening then presses the left side of the wheel's hub against the left wheel hub receiving surface 362 of the left adapter 332A, thereby drawing the wheel's hub tight against the left wheel hub receiving surface 362 (and hence drawing the wheel's hub tight against the first (left) dropout 224A). Then, the left M5 pinch bolts 244A and the right M5 pinch bolts 244B are inserted into the left bolt holes 246A and the right bolt holes 246B, respectively. The heads of the left M5 pinch bolts 244A and the right M5 pinch bolts 244B are tightened against the base of the left and right bolt holes, 246A and 246B, respectively. FIG. 3D is a side perspective view of an assembled axle adapter assembly in relation to the lower front fork legs and axle 302, and as described herein, in accordance with an embodiment.

Figure 4:
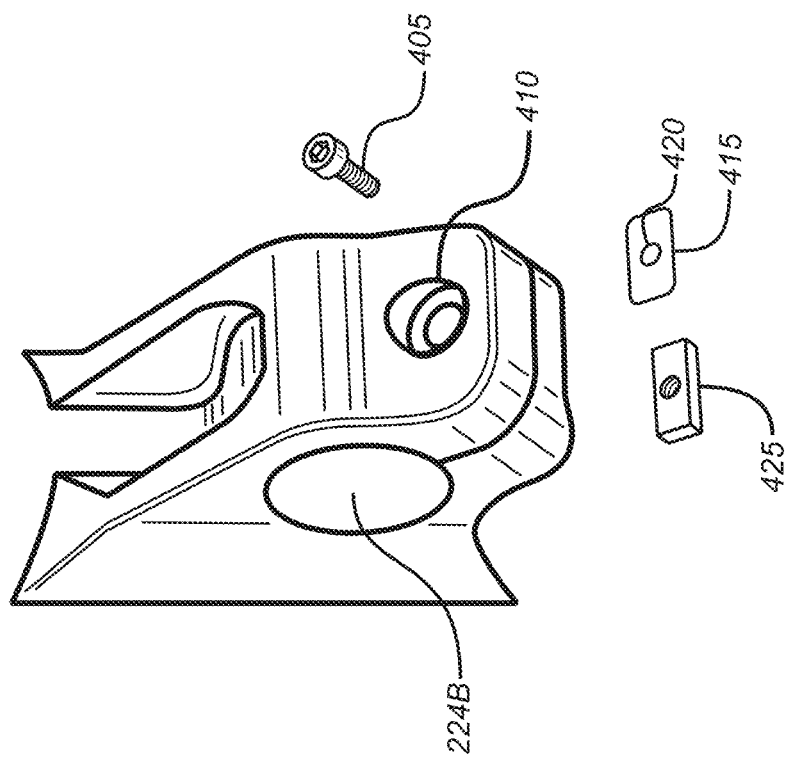
FIG. 4 is an exploded view of an axle adapter assembly in position to convert the front axle to fit a 20 mm wheel hub, in accordance with an embodiment.

With reference to FIG. 4, an exploded view of an axle adapter assembly in position to convert the front axle to fit a 20 mm wheel hub is shown, in accordance with an embodiment. FIG. 4 shows that in an alternative embodiment, one pinch bolt 405 may be used in screw into the pinch bolt hole 410, through the pinch shim bolt hole 420 of the axle pinch shim 415, and then through the axle pinch bar 425, thereby clamping shut the dropout (such as dropout 224B), in place of the two or more pinch bolts 244B used to screw into the pinch bolt holes 246B, through the pinch shim bolt holes 328 of the axle pinch shim 326 and then through the axle pinch bar 356B (see FIG. 1C, for example).

Thus, the components of the axle adapter assembly, such as the left adapter 332A and the right adapter 332B, the left axle pinch shim 320 and the right axle pinch shim 320 and the left hanging tab 324 and right hanging tab 330 include novel features, enabling a conversion of axles having varying diameters to be installed on a vehicle to fit different center bore sizes of wheel hubs.

It should be noted that any of the features disclosed herein may be useful alone or in any suitable combination. While the foregoing is directed to embodiments of the present invention, other and further embodiments of the invention may be implemented without departing from the scope of the invention, and the scope thereof is determined by the claims that follow.

What we claim is:

1. An adapter assembly configured for conversion of an axle installed on a vehicle to fit different center bore sizes of wheel hubs, said adapter assembly comprises:
    an axle configured for coupling dropouts of fork legs of a lower fork;
    adapters configured for being inserted within the dropouts and engaging an outer surface of the axle and retaining the axle upon engagement; and
    axle pinch shims configured for being inserted into slits of the dropouts and the adapters, wherein upon the insertion, the adapters are aligned with the dropouts, such that shoulders of the adapters retain edges of a wheel hub of the wheel hubs.

2. The adapter assembly of claim 1 further comprising:
    a first adapter and a second adapter comprise a tube configured for insertion within dropouts of said fork legs, said tube comprising:
        a lengthwise slit formed along a longitudinal axis of said tube from a first end to a second end, wherein said lengthwise slit is configured for receiving a hanging tab of one of said axle pinch shims to position said tube with said dropout such that a lip extension holds said edge of said wheel hub during at least one of installation and removal of said axle; and
    a set of axle pinch shims, wherein each axle pinch shim of said set of axle pinch shim comprises:
        a width and a length, said width configured for enabling said each axle pinch shim to be disposed within an opening of said dropout, said length having a first side and a second side opposite said first side, wherein said dropout comprises:
            a split-clamp pinch bearing defining said opening, said split-clamp pinch bearing comprising:
                a first opposing clamp end; and
                a second opposing clamp end, wherein said first opposing clamp end and said second opposing clamp end comprises aligned pinch bolt holes configured for receiving pinch bolts; and
            axle pinch shim bolt holes disposed in said first side of said length of said axle pinch shim and aligned with said pinch bolt holes, said axle pinch shim bolt holes configured for receiving said pinch bolts.

3. The adapter assembly of claim 2, wherein said lengthwise slit comprises:
    a jogging pattern disposed at a second end of said tube, wherein said jogging pattern is configured for limiting lateral movement of said axle pinch shim.

4. The adapter assembly of claim 3, wherein a first adapter of said set of adapters comprises a diameter measurement that is different than a second adapter of said set of adapters.

5. The adapter assembly of claim 3, wherein said second side of said length of said each axle pinch shim comprises:
    a hanging tab configured for being inserted into said lengthwise slit, such that said hanging tab prevents at least a rotational movement of said each adapter during said at least one of installation and removal of said axle.

6. The axle adapter assembly of claim 5, wherein a first hanging tab of a first axle pinch shim of said set of axle pinch shims is of a different shape from a second hanging tab of a second axle pinch shim of said set of axle pinch shims.

7. The axle adapter assembly of claim 3, wherein a second end of said axle comprises:
    a turn mechanism configured for receiving a turning tool, whereupon said axle rotates upon a turning of said turning tool.

* * * * *